A. M. BARRETT.
LIFTING TRUCK.
APPLICATION FILED MAY 3, 1920.
1,428,522.
Patented Sept. 12, 1922.
2 SHEETS—SHEET 1.
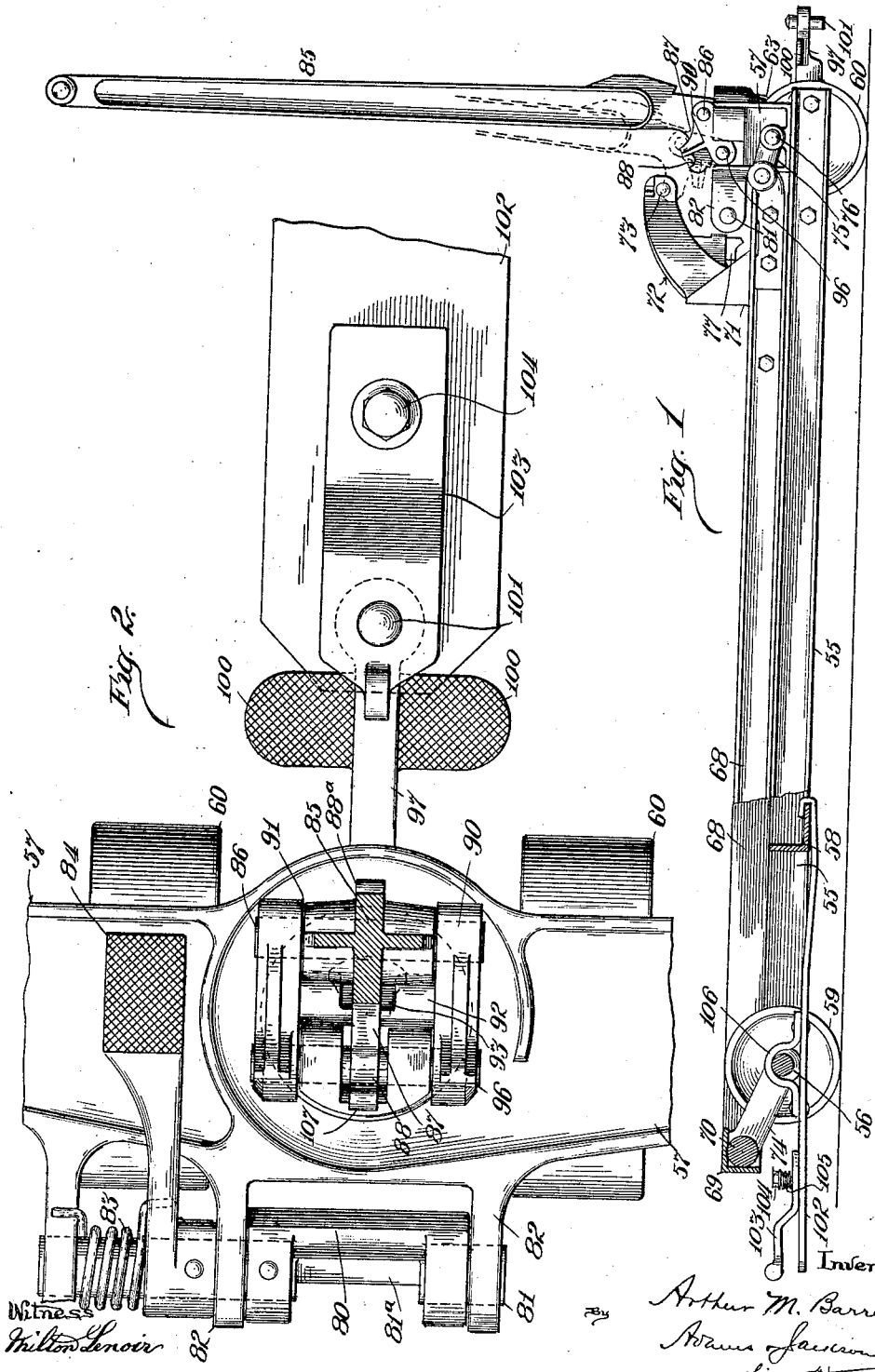

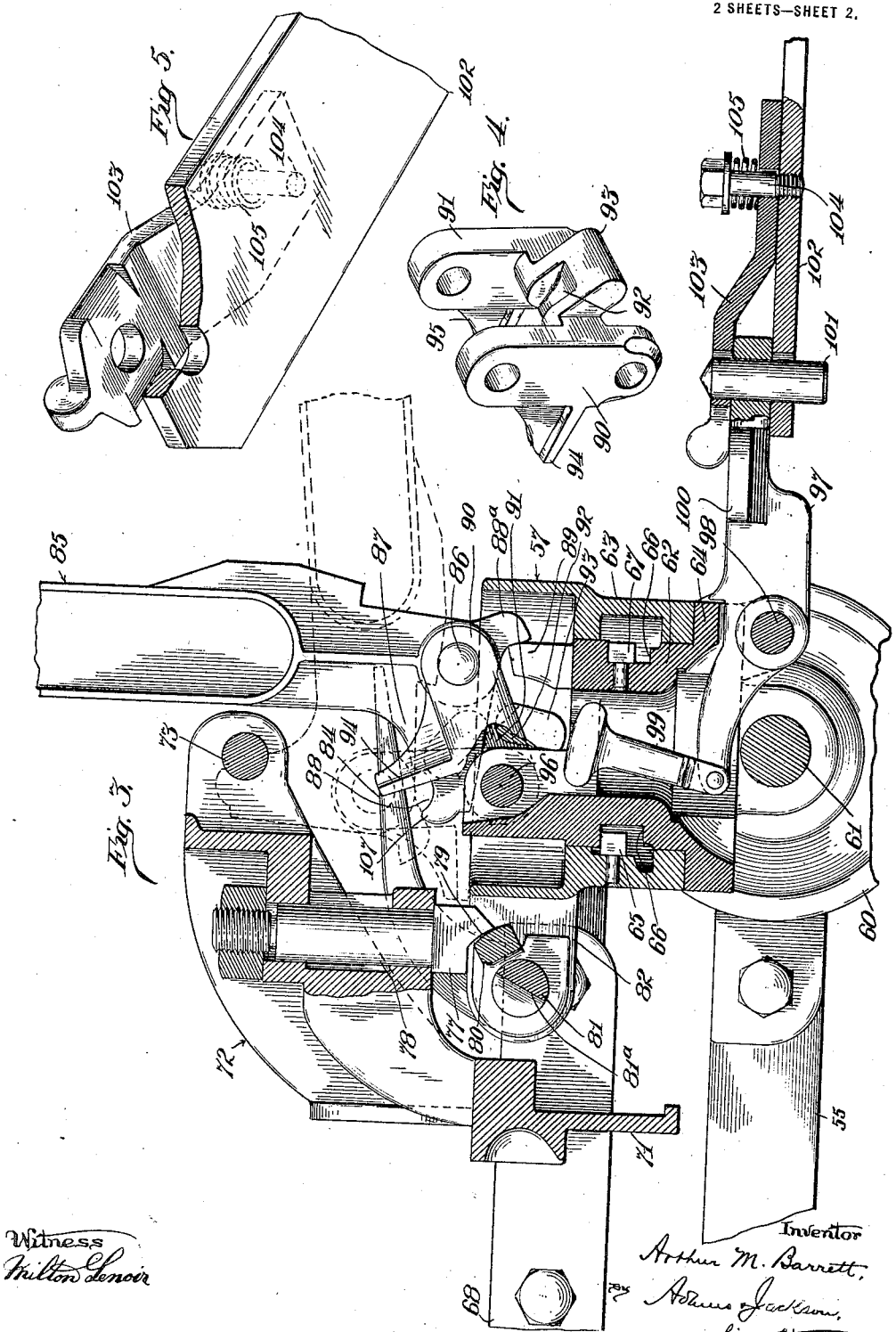

Patented Sept. 12, 1922.

1,428,522

UNITED STATES PATENT OFFICE.

ARTHUR M. BARRETT, OF WINNETKA, ILLINOIS.

LIFTING TRUCK.

Application filed May 3, 1920. Serial No. 378,514.

*To all whom it may concern:*

Be it known that I, ARTHUR M. BARRETT, a citizen of the United States, and a resident of Winnetka, in the county of Cook and State of Illinois, have invented certain new and useful Improvements in Lifting Trucks, of which the following is a specification, reference being had to the accompanying drawings.

My invention relates to lifting trucks of the type shown and described in my pending application, Serial No. 208,280, filed December 21, 1917, and comprising a main frame mounted on supporting and steering wheels, a lifting frame mounted on the main frame and connected thereto by swinging links so that by endwise movement of the lifting frame in one direction it may be elevated, and a lever or handle which is employed either to steer the front wheel or wheels or to raise the lifting frame. In the construction described in my said application the operating lever or handle is mounted upon a movable fulcrum supported by swinging links so that by shifting its fulcrum the handle may be moved either into operative engagement with the lifting frame or may be moved to its steering position.

My present invention provides certain improvements in the mounting of the steering lever or handle which simplify and improve the construction and operation of the truck, and also make provision for coupling the truck up either alone with a tractor, or in connection with other trucks to form a train, so that one or more trucks may be hauled from place to place and be conveniently and accurately steered while forming a part of such a train. A truck embodying the latter features is shown and described in an application of William Childress filed of even date herewith, and as regards this feature my present invention comprises certain improvements which have to do with the locking of the handle up out of operative position, and with the release of the handle when the truck is separated from the tractor, or from other trucks in the train. The nature of my present improvements will more particularly appear from the following description thereof in connection with the accompanying drawings. What I regard as new is set forth in the claims.

In the drawings,—

Fig. 1 is in general a side elevation of my improved truck, some parts being in section;

Fig. 2 is an enlarged detail, being a partial plan view of the forward portion of the truck, the steering lever or handle being in section;

Fig. 3 is substantially a central longitudinal vertical section of the parts shown in Fig. 2;

Fig. 4 is a perspective view of the frame which connects the fulcrum of the handle with the king bolt or steering head; and Fig. 5 is a perspective view, partly broken away, showing one of the coupling devices for connecting the forward portion of the truck with the rear portion of an adjoining truck or with a tractor.

Referring to the drawings,—55 indicates two opposite side bars which are connected at the rear by an axle 56 and at the front are connected by a cross-head 57 having generally the form of an arch. These parts constitute the main frame of the truck. 58 indicates a cross-bar, preferably L-shaped in section, which connects the side bars 55 together intermediately of their length, as shown in Fig. 1. 59 indicates the rear wheels which are carried by the rear axle 56 and are preferably provided with anti-friction bearings of any suitable description. 60 indicates the front or steering wheels which are mounted on spindles 61 carried at opposite sides of a steering head or king bolt 62, as best shown in Fig. 3. This steering head, which is cylindrical in form, is journaled in a sleeve 63 provided at the center of the cross-head 57 and depending therefrom, as shown in Figs. 2 and 3. The lower margin of the sleeve 63 rests upon a flange 64 provided at the lower end of the steering head 62. The steering head 62 and sleeve 63 are held against accidental separation by means of a bolt 65 carried by the sleeve 63 and projecting into a groove 66 in the steering head 62, as best shown in Fig. 3. 67 indicates a stop pin carried by the steering head 62 and adapted to engage the head of the bolt 65 when the steering head is turned far enough in either direction to bring them into engagement with each other.

68 indicates the side bars of the lifting frame, which overlie the side bars 55 of the main frame and are connected together at the rear by a cross-bar 69 and a shaft 70. At the front they are connected by a cross-bar 71, shown in Fig. 3, which carries an arched bracket or yoke 72. This yoke extends upward and forward from the cross-bar 71 and carries a pin 73 which is adapted to be engaged by the steering handle when the lifting frame is to be elevated, as will be hereinafter described. 74 indicates a pair of links which connect the rear axle 56 with the shaft 70, and 75 indicates a pair of links which connect the forward ends of the side bars 68 with the end portions of the crosshead 57, said links being connected with said cross-head by pivots 76, as shown in Fig. 1. The links 74, 75 occupy an approximately horizontal position when the lifting frame is in its lowered position shown in Fig. 1, and it will be apparent that by drawing the lifting frame forward the consequent rocking of said links will act to elevate the lifting frame to the position shown in Fig. 3. For locking the lifting frame in its elevated position it is provided with a stationary dog 77 which is carried at the lower end of a shank 78 fitted in a suitable socket in the yoke 72, as shown in Fig. 3, said dog having a beveled face 79. This dog is adapted to cooperate with a rocking stop 80 mounted on and secured to a shaft 81 which is carried by arms 82 projecting rearwardly from the cross-head 57, as best shown in Fig. 2. The arrangement is such that when the lifting frame is drawn forward and upward the beveled face 79 of the dog 77 will strike the stop 80 and rock it in a clockwise direction until the dog passes it, whereupon the stop 80 is moved into line between the dog 77 and the shaft 81 so that the line of direction of the thrust of the dog upon said stop will lie in a line slightly above the axis of said shaft. The stop will, therefore, act to lock the lifting frame in its elevated position, but it may be released by moving the stop 80 down out of engagement with the dog 77. In order to normally hold the stop 80 in operative position a spring 83 is provided on the shaft 81, said spring being arranged to be put under greater tension when the shaft 81 is rocked in a clockwise direction, as viewed in Fig. 3. The shaft 81 is also provided with a foot lever 84 for conveniently moving the stop 80 out of operative position. In order that the shaft 81 may not interfere with the movement of the dog 77 said shaft is preferably cut away for a portion of its length, as shown at 81ᵃ in Figs. 2 and 3.

85 indicates the lifting lever or handle which is fulcrumed upon a pivot 86 near its lower end and is provided adjacent its fulcrum with an arm 87 which extends at a pronounced angle thereto so that the lower portion of said handle forms substantially a bell-crank lever. The arm 87 is provided near its outer end with a recess 88 which is adapted to engage the pin 73 carried by the yoke 72, as indicated by dotted lines in Fig. 3. The inner or lower end of the handle is also provided with a projecting lug 88ᵃ which when the handle is in an upright position extends forward and downward, as shown in Fig. 3, and is adapted to engage the forward upper margin 89 of the steering head 62. The fulcrum 86 of the handle is mounted in a rocking frame comprising link-like side members 90, 91 connected intermediately of their length by a transverse member 92, a portion of which is offset to form a lug or projection 93, as shown in Fig. 4. At the opposite side of the frame are provided flanges 94—95 which form seats adapted to bear upon the upper margin of the cross-head 57 when the lifting handle is in position to raise the lifting frame. The members 90, 91 are pivotally connected at their lower ends to the upper rear portion of the steering head 62 by a pivot or shaft 96 shown in Fig. 3, so that by rocking the fulcrum supporting frame the handle may be moved either into position to raise the lifting frame, to its steering position, or to the upright position shown in full lines in Fig. 3. By an inspection of the dotted line positions indicated in Fig. 3, it will be observed that by swinging the fulcrum supporting frame rearwardly until the flanges 94 rest upon the rear margins of the crosshead 57 the fulcrum 86 will be raised and at the same time moved rearwardly to bring the arm 87 into position to engage the pin 73 carried by the lifting frame yoke 72. If the lifting frame is then in its lowered position the handle 85 will be inclined backward slightly from its upright position, and by then swinging the handle forward the lifting frame will be drawn forward and upward to the position shown in full lines in Fig. 3, the handle then occupying the position shown in dotted lines in said figure. The handle may then be released from the pin 73 by raising its free end, whereupon the fulcrum 86 may be swung forward either to the position shown in full lines in Fig. 3, or, if the handle is to be used for steering the truck, it can be swung down into an approximately horizontal position, so that it will be supported by the forward margin of the cross-head 57. When the handle 85 is in its upright position it will be prevented from swinging forward by the engagement of the lug 88ᵃ with the portion 89 of the steering head 62, and from rocking backward by the engagement of the projecting lug or head 107 of the arm 87 with the rear marginal portion of the steering head 62, so that it will be held securely in an approximately upright position, and in this position may be conveniently used to push the truck. It may, however, be released by moving it upward sufficiently to carry the lug 88ª out of engagement with the member 89.

For releasing the handle when it is secured in its upright position as above described, I provide a rocking lever or treadle 97 which is mounted on a pivot 98 carried at the lower forward portion of the steering head 62, between the steering wheels 60, as shown in Fig. 3. Said treadle is pivoted between its ends, and its rear end extends back under the central portion of the steering head, which is tubular as shown, where it carries a plunger 99 moving in the bore of the steering head and underlying the lug or projection 93 carried by the fulcrum supporting frame. The relative position of these parts when the handle is in its upright position is shown in Fig. 3, and it will, therefore, be readily understood that by depressing the forward end of the treadle 97 the plunger 99 will be moved upwardly into engagement with the lug 93 and by means of said lug will rock the fulcrum carrying frame in a counterclockwise direction, thereby lifting the lug 88ª out of engagement with the member 89 so as to release the handle 85. As shown in Fig. 2 the treadle 97 is preferably provided with foot plates 100 at its opposite sides so that it can be conveniently operated from either side of the truck. It will be noted that the treadle 97 projects forward a short distance beyond the front of the truck, and in order that it may be used as a coupling device to connect the truck with a tractor, or with other trucks, it is provided with a hole in which is tightly fitted a coupling pin 101, as shown in Fig. 3. This coupling pin is adapted to cooperate with a coupling device carried at the rear of another truck, or by a tractor, and comprising a draw-bar 102 having a hole which receives the lower portion of the pin 101, and a strap 103 which is pivotally mounted on the draw bar 102 and is adapted to engage the upper part of the pin 101, the forward end of the treadle 97 extending between the draw-bar and strap. The forward portion of the strap is connected with the draw bar 102 by a bolt 104 and is yieldingly held down upon the draw bar by a spring 105. The forward end of the strap may be connected with the rear portion of another truck by hooking it over the cross-bar 58, as shown in Fig. 1, and by securing it intermediately to the rear axle 56 by a strap 106. The particular construction of the coupling devices is not herein claimed as it forms part of the subject-matter of the Childress application hereinbefore referred to.

By the construction described the handle may readily be moved into either of its positions, and when locked in its upright position it can readily be released by simply stepping on the treadle 97. Said treadle may also be used for raising the handle into operative engagement with the lifting frame when the latter is in its elevated position, thereby relieving the operator of the work of lifting the handle to that position by a manual effort. My improved construction is advantageous not only when the truck is used as a trailer, in which case the handle is locked up out of the way and the truck may be coupled up closely to other trucks or to a tractor, but also when the truck is used individually, as it is frequently desirable to lock the handle in an upright position, as when the truck is not in use or when the truck is to be pushed instead of pulled.

I have illustrated and described my improvements as applied to a truck having two front or steering wheels, but my invention is not limited to use with that construction and the claims hereinafter made are to be construed accordingly. In other respects also my invention is not limited to the specific construction shown and described except in so far as such construction is specifically claimed, but includes generically the subject-matter of the broader claims.

What I claim as my invention and desire to secure by Letters Patent, is—

1. A lifting truck comprising a main frame having supporting wheels and a steering member, a lifting frame mounted on said main frame, a steering handle adapted to be operated to raise the lifting frame, means for securing the handle in a substantially upright position, mechanism adapted to be operated to move said handle to disengage it from said securing means.

2. A lifting truck comprising a main frame having supporting wheels and a steering member, a lifting frame mounted on said main frame, a steering handle adapted to be operated to raise the lifting frame, means for securing the handle in a substantially upright position, and a lever adapted to be operated to move said handle to disengage it from said securing means.

3. A lifting truck comprising a main frame having supporting wheels and a steering member, a lifting frame mounted on said main frame, a steering handle adapted to be operated to raise the lifting frame, means for securing the handle in a substantially upright position, and a lever connected with said steering member and adapted to be operated to move said handle to disengage it from said securing means.

4. A lifting truck comprising a main frame having supporting wheels and a steering member, a lifting frame mounted on said main frame, a handle movable into and out of operative relation to said lifting frame, and mechanism adapted to be operated to move said handle into operative relation with said lifting frame.

5. A lifting truck comprising a main frame having supporting wheels and a steering member, a lifting frame mounted on said main frame, a handle movable into and out of operative relation to said lifting frame, and a lever adapted to be operated to move said handle into operative relation with said lifting frame.

6. A lifting truck comprising a main frame having supporting wheels and a steering member, a lifting frame mounted on said main frame, a handle movable into and out of operative relation to said lifting frame, and a lever connected with the steering member and adapted to be operated to move said handle into operative relation with said lifting frame.

7. A lifting truck comprising a main frame having supporting wheels and a steering member, a lifting frame mounted on said main frame, a steering handle mounted on a shiftable fulcrum and movable into and out of operative relation with said lifting frame, means for securing the handle in a substantially upright position, and means for moving said handle to disengage it from said securing means.

8. A lifting truck comprising a main frame having supporting wheels and a steering member, a lifting frame mounted on said main frame, a steering handle movable into and out of operative relation with said lifting frame, means for securing the handle in a substantially upright position, and mechanism adapted to be operated to move said handle to disengage it from said securing means and to move it into operative relation to said lifting frame.

9. A lifting truck comprising a main frame having supporting wheels and a steering member, a lifting frame mounted on said main frame, a steering handle adapted to be operated to raise the lifting frame, means for securing the handle in a substantially upright position, means for moving said handle to disengage it from said securing means, and means connected with the steering member for coupling the truck with an adjoining truck.

10. A lifting truck comprising a main frame having supporting wheels and a steering member, a lifting frame mounted on said main frame, a steering handle adapted to be operated to raise the lifting frame, means for securing the handle in a substantially upright position, and a lever for moving said handle to disengage it from said securing means, said lever having means for coupling it to an adjoining truck.

11. A lifting truck comprising a main frame having supporting wheels, a steering head connected with said main frame, a lifting frame mounted on said main frame, a steering handle mounted on said steering head and adapted to be operated to raise the lifting frame, means for securing the handle in a substantially upright position, and means mounted on said steering head and adapted to be operated to move said handle to disengage it from said securing means.

12. A lifting truck comprising a main frame having supporting wheels, a steering head connected with said main frame, a lifting frame mounted on said main frame, a steering handle mounted on said steering head and adapted to be operated to raise the lifting frame, means for securing the handle in a substantially upright position, and a lever mounted on said steering head and adapted to be operated to move said handle to disengage it from said securing means.

13. A lifting truck comprising a main frame having supporting wheels, a steering head connected with said main frame, a lifting frame mounted on said main frame, a steering handle mounted on said steering head and adapted to be operated to raise the lifting frame, means for securing the handle in a substantially upright position, and a lever mounted on said steering head and adapted to be operated to move said handle to disengage it from said securing means, said lever being provided with a coupling device.

14. A lifting truck comprising a main frame having supporting wheels, a tubular steering head journaled in said main frame, a lifting frame mounted on said main frame, a handle having a movable fulcrum mounted on said steering head, said handle being adapted to be operated to elevate said lifting frame or to steer the truck, a plunger mounted in said steering head and movable to move the fulcrum of said handle, and means for actuating said plunger.

15. A lifting truck comprising a main frame having supporting wheels, a tubular steering head journaled in said main frame, a lifting frame mounted on said main frame, a handle having a movable fulcrum mounted on said steering head, said handle being adapted to be operated to elevate said lifting frame or to steer the truck, a plunger mounted in said steering head and movable to move the fulcrum of said handle, and a lever mounted on said steering head for operating said plunger.

16. A lifting truck comprising a main frame having supporting wheels, a tubular steering head journaled in said main frame, a lifting frame mounted on said main frame, a steering handle mounted on said steering head and movable into and out of operative relation to said lifting frame, a plunger mounted in said steering head and adapted to operate to move said steering handle into operative relation to the lifting frame, means for actuating said plunger, and means carried by said steering head for holding said handle in a substantially upright position.

17. A lifting truck comprising a main frame having supporting wheels, a tubular steering head journaled in said main frame, a lifting frame mounted on said main frame, a steering handle mounted on said steering head and movable into and out of operative relation to said lifting frame, a plunger mounted in said steering head and movable into engagement with said steering handle, for moving said handle into operative relation with said lifting frame, a lever mounted on said steering head for operating said plunger, and means carried by said steering head for holding said handle in a substantially upright position.

18. A lifting truck comprising a main frame having supporting wheels, a steering head journaled in said main frame, a lifting frame mounted on said main frame, a steering handle mounted on the upper portion of said steering head and having a movable fulcrum, said steering head having means for securing said handle in a substantially upright position, and mechanism adapted to be operated to move said fulcrum to release the handle from said securing means.

19. A lifting truck comprising a main frame having supporting wheels, a lifting frame mounted on said main frame, an integral tubular steering head and king bolt journaled in said main frame, a steering handle connected with said steering head and movable into or out of position to raise the lifting frame and means operating through said steering head for moving said handle into operative relation to said lifting frame.

20. A lifting truck comprising a main frame having supporting wheels and a steering member, a lifting frame mounted on said main frame, a steering handle mounted on a shiftable fulcrum and movable into and out of operative relation to said lifting frame, a lever mounted on said steering member and extending forward therefrom, and means operated by said lever for shifting the fulcrum of said steering handle.

21. A lifting truck comprising a main frame having supporting wheels, a steering head journaled in said main frame, a lifting frame mounted on said main frame, a rocking frame mounted on said steering head, and a steering handle fulcrumed upon said rocking frame and movable into and out of operative relation to said lifting frame, said rocking frame having means for preventing excessive rearward movement thereof.

22. A lifting truck comprising a main frame having supporting wheels, a steering head journaled in said main frame, a lifting frame mounted on said main frame, a rocking frame mounted on said steering head, and a steering handle fulcrumed upon said rocking frame and movable into and out of operative relation to said lifting frame, said rocking frame having a rearwardly projecting flange adapted to engage the main frame for preventing excessive rearward movement of said rocking frame.

23. A lifting truck comprising a main frame having supporting wheels, a steering head journaled in said main frame, a lifting frame mounted on said main frame, an H-shaped rocking frame mounted on said steering head, and a steering handle fulcrumed on said rocking frame and movable into and out of operative relation to said lifting frame.

24. A lifting truck comprising a main frame having supporting wheels, a steering head journaled in said main frame, a lifting frame mounted on said main frame, an H-shaped rocking frame mounted on said steering head, a steering handle fulcrumed on said rocking frame and movable into and out of operative relation to said lifting frame, an arm carried by said rocking frame, a plunger in said steering head and movable into engagement with said arm, and a lever for actuating said plunger.

25. A lifting truck comprising a main frame having supporting wheels, an endwise movable lifting frame mounted on said main frame and having a downwardly projecting dog fixedly connected therewith, a steering head, a steering handle adapted to be operated to move said lifting frame endwise to raise the same, and a rocking member pivotally mounted on the main frame back of, and adapted to be engaged by, said dog when the lifting frame is in its elevated position, for locking it in such position.

26. A lifting truck comprising a main frame having supporting wheels, an endwise movable lifting frame mounted on said main frame and having a fixed downwardly projecting dog, a steering head, a steering handle adapted to be operated to move said lifting frame endwise to raise the same, a rocking member pivotally mounted on the main frame back of, and adapted to be engaged by, said dog when the lifting frame is in its elevated position, to lock it in such position, means for normally holding said member in operative position, and a lever for moving said rocking member out of operative position.

ARTHUR M. BARRETT.

Certificate of Correction.

It is hereby certified that in Letters Patent No. 1,428,522, granted September 12, 1922, upon the application of Arthur M. Barrett, of Winnetka, Illinois, for an improvement in "Lifting Trucks," errors appear in the printed specification requiring correction as follows: Page 3, line 100, claim 1, before the word "mechanism" insert the word *and;* page 4, line 44, claim 9, strike out the words "means for moving" and insert instead *mechanism adapted to be operated to move;* same page, line 125, claim 16, for the word "operate" read *be operated;* and that the said Letters Patent should be read with these corrections therein that the same may conform to the record of the case in the Patent Office.

Signed and sealed this 10th day of October, A. D., 1922.

[SEAL.]                       WM. A. KINNAN,
*Assistant Commissioner of Patents.*